US012767237B2

(12) United States Patent
Nallet et al.

(10) Patent No.: US 12,767,237 B2
(45) Date of Patent: Oct. 20, 2026

(54) VEHICLE FRONT, VEHICLE COMPRISING SUCH A VEHICLE FRONT, AND METHOD ASSOCIATED

(71) Applicant: Volvo Truck Corporation, Gothenburg (SE)

(72) Inventors: Sebastien Nallet, Venerieu (FR); Raphael Ribero, Millery (FR)

(73) Assignee: Volvo Truck Corporation, Gothenburg (SE)

( * ) Notice: Subject to any disclaimer, the term of this patent is extended or adjusted under 35 U.S.C. 154(b) by 189 days.

(21) Appl. No.: 18/903,067

(22) Filed: Oct. 1, 2024

(65) Prior Publication Data

US 2025/0115306 A1 Apr. 10, 2025

(30) Foreign Application Priority Data

Oct. 4, 2023 (EP) .................................... 23201678

(51) Int. Cl.
*B62D 25/10* (2006.01)
*B60K 11/08* (2006.01)
*B62D 25/12* (2006.01)

(52) U.S. Cl.
CPC ............ *B62D 25/10* (2013.01); *B60K 11/085* (2013.01); *B62D 25/12* (2013.01)

(58) Field of Classification Search
CPC ......... A47B 31/06; A47B 5/00; B60K 11/085; B62D 25/10; B62D 25/12
See application file for complete search history.

(56) References Cited

U.S. PATENT DOCUMENTS

| | | | |
|---|---|---|---|
| 2,024,049 A | 12/1935 | Mahon | |
| 5,649,734 A | 7/1997 | Speis | |
| 7,073,847 B2 | 7/2006 | Morrow et al. | |
| 8,070,196 B2 | 12/2011 | Couto et al. | |
| 11,142,129 B2 | 10/2021 | Howard, II et al. | |
| 2020/0130586 A1 | 4/2020 | Hoffman et al. | |

FOREIGN PATENT DOCUMENTS

| | | |
|---|---|---|
| CN | 105751887 A | 7/2016 |
| JP | H0731572 U | 6/1995 |
| WO | 201381582 A1 | 6/2013 |

OTHER PUBLICATIONS

European Search Report for European Patent Application No. 23201678.2, completed Mar. 20, 2024, 2 pages.

*Primary Examiner* — Timothy Hannon
(74) *Attorney, Agent, or Firm* — Withrow & Terranova, PLLC

(57) ABSTRACT

A vehicle front for a vehicle, the vehicle front comprising an opening, configured to give access to a motor compartment, a front hood comprising a first pivoting system, configured to be engaged, wherein the front hood is configured to pivot around a first axis, and disengaged, and a second pivoting system, configured to be engaged, wherein the front hood is configured to pivot around a second axis, and disengaged, wherein the front hood is pivotable between a closed position and a second open position, wherein in the closed position, the front hood covers the opening and the pivoting systems are engaged and in the second open position, the front hood is pivoted around the second axis to be substantially horizontal so the front hood can be used as a table.

15 Claims, 6 Drawing Sheets

VEHICLE FRONT, VEHICLE COMPRISING SUCH A VEHICLE FRONT, AND METHOD ASSOCIATED

PRIORITY APPLICATIONS

The present application claims priority to European Patent Application No. 23201678.2, filed on Oct. 4, 2023, and entitled "VEHICLE FRONT, VEHICLE COMPRISING SUCH A VEHICLE FRONT, AND METHOD ASSOCIATED," which is incorporated herein by reference in its entirety.

TECHNICAL FIELD

The disclosure relates generally to vehicles. In particular aspects, the disclosure relates to a vehicle front, a vehicle comprising such a vehicle front and an associated method. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

Drivers of vehicles, in particular heavy-duty vehicles such as trucks, spend a large amount of time in close proximity of the truck while the truck is parked, for example when eating, resting, socializing, etc. These activities can require the use of a flat surface as a table, for example when eating. However, current trucks do not offer a convenient surface that can be used as a table and the drivers use instead an independent table, or steps to access a cabin of the truck. These solutions are inconvenient, as the driver needs to carry a table in the truck, the steps are not appropriate dimensions and height to be used as a table and present safety issues, as cluttered steps may prevent easy access to the truck cabin. The aim of this invention is to solve these disadvantages and include in the truck a surface, that is integrated to the truck and convenient for use as a table.

SUMMARY

According to a first aspect of the disclosure, the invention relates to vehicle front for a vehicle, the vehicle front comprising:

- a motor compartment;
- an opening, configured to give access to the motor compartment;
- at least one mechanical stop; and
- a front hood, the front hood comprising:
  - a first pivoting system, configured to be engaged, wherein the front hood is configured to pivot around a first axis, and disengaged, wherein the front hood is configured to move independently of the first axis; and
  - a second pivoting system, configured to be engaged, wherein the front hood is configured to pivot around a second axis, parallel to the first axis, and disengaged, wherein the front hood is configured to move independently of the second axis,
- wherein the front hood is pivotable between a closed position, a first open position and a second open position, wherein:
- in the closed position, the front hood covers the opening and the first and second pivoting systems are engaged;

- in the first open position, the first pivoting system is engaged, the second pivoting system is disengaged and the front hood is pivoted around the first axis and leaves the opening uncovered; and
- in the second open position, the second pivoting system is engaged, the first pivoting system is disengaged and the front hood is pivoted around the second axis to be substantially horizontal;

wherein when the front hood is in the second open position, the front hood comes into contact with the mechanical stop, which maintains the front hood substantially horizontal so the front hood can be used as a table.

The first aspect of the disclosure may seek to provide an element integrated in the vehicle, that is appropriate for use as a table. A technical benefit may include providing a surface usable as a table that is safe to use and easy to install and transport, without adding a specific device that is used only as a table.

Optionally in some examples, including in at least one preferred example, when the first pivoting system is disengaged, the second pivoting system is engaged, and when the second pivoting system is disengaged, the first pivoting system is engaged. A technical benefit may include improving the safety the driver when manipulating the front hood.

Optionally in some examples, including in at least one preferred example, the first axis extends at a first axis height, measured from a bottom of the vehicle front, and the second axis extends at a second axis height, measured from the bottom of the vehicle front, and wherein the first axis height is superior to the second axis height.

Optionally in some examples, including in at least one preferred example, the front hood comprises an air-cooling opening and at least one shutter movable between an open position, where the shutter leaves the air-cooling opening uncovered, and a closed position, where the shutter covers the air-cooling opening. A technical benefit may include maximizing a surface usable as a table by the user while still allowing air-cooling of the vehicle front.

Optionally in some examples, including in at least one preferred example when the front hood is in the second open position, the shutter is in the closed position. A technical benefit may include maximizing a surface usable as a table by the user when the front hood is used as a table.

Optionally in some examples, including in at least one preferred example, when the shutter is in the closed position, a work surface of the front hood is flat. A technical benefit may include increasing the convenience of the front hood for its use as a table.

Optionally in some examples, including in at least one preferred example, the front hood further comprises a shutter motor, configured to move the shutter in the closed position and in the open position. A technical benefit may include making the use of the front hood easier for the user.

Optionally in some examples, including in at least one preferred example, the vehicle front further comprises a vehicle motor located in the motor compartment for propelling the vehicle, wherein when the front hood is in the closed position and the vehicle motor is on, the shutter is in the open position. A technical benefit may include optimizing the air-cooling of the vehicle front.

Optionally in some examples, including in at least one preferred example, the vehicle front further comprises a hood sensor, configured to determine a position of the front hood between the closed position and the second open position and wherein, when the hood sensor determines the front hood to be in the closed position, the shutter motor moves the shutter into the open position and when the hood sensor determines the front hood to be in the second closed position, and the vehicle motor is on, the shutter motor moves the shutter into the open position. A technical benefit may include making the front hood easier to se by the user.

Optionally in some examples, including in at least one preferred example, the front hood comprises a plurality of shutters and front hood further comprises a linking rod, connected to each shutter, and the linking rod is configured to move between a first position, where all the shutters are in the open position, and a second position, where all the shutters are in the closed position. A technical benefit may include making the air-cooling more effective.

Optionally in some examples, including in at least one preferred example, the linking rod is connected to a rod motor, configured to move the linking rod in the first and the second position. A technical benefit may include moving the shutters in the open and the closed positions easier and faster.

According to a second aspect of the disclosure, the invention relates to a vehicle comprising the vehicle front as described above.

The second aspect of the disclosure may seek to provide a vehicle with an element integrated to the vehicle, that is appropriate for use as a table. A technical benefit may include providing a surface usable as a table that is safe to use and easy to install and transport, as it is part of the vehicle, without adding a specific device that is used only as a table.

Optionally in some examples, including in at least one preferred example, the vehicle front further comprises a cooling radiator located in the motor compartment, the opening being further configured to give access to the cooling radiator. A technical benefit may include improving the functioning of the truck.

Optionally in some examples, including in at least one preferred example, the vehicle front is as described above and the vehicle front further comprises a shutter sensor, configured to determine if the at least one shutter is in the open position or in the closed position. A technical benefit may include making the moving of the shutters easier by including information of the position of the shutters.

Optionally in some examples, including in at least one preferred example, the vehicle front is according to the previous description and the vehicle comprises a control unit, configured to send an alarm signal if the vehicle motor is on, the hood sensor measures that the front hood is in the closed position and the shutter sensor determines that the at least one shutter is in the closed position. A technical benefit may include making the vehicle safer and preventing overheating of the vehicle.

According to a third aspect of the disclosure, the invention further relates to a method for using a front hood of a vehicle front for a vehicle as a table, the vehicle front comprising:

- a motor compartment;
- an opening, configured to give access to the motor compartment;
- at least one mechanical stop; and
- a front hood, the front hood comprising:
  - a first pivoting system, configured to be engaged, wherein the front hood is configured to pivot around a first axis, and disengaged, wherein the front hood is configured to move independently of the first axis; and
  - a second pivoting system, configured to be engaged, wherein the front hood is configured to pivot around a second axis, parallel to the first axis, and disengaged, wherein the front hood is configured to move independently of the second axis,
- wherein the front hood is pivotable between a closed position, a first open position and a second open position, wherein:
- in the closed position the front hood covers the opening and the first and second pivoting systems are engaged,
- in the first open position, the first pivoting system is engaged, the second pivoting system is disengaged and the front hood is pivoted around the first axis and leaves the opening uncovered,
- in the second open position, the second pivoting system is engaged, the first pivoting system is disengaged and the front hood is pivoted around the second axis to be substantially horizontal;

wherein when the front hood is in the second open position, the front hood comes into contact with the mechanical stop, which maintains the front hood substantially horizontal so it can be used as a table,

- the method comprising:
- while the second pivoting system is engaged, disengaging the first pivoting system; and
- pivoting the front hood around the second axis until it is substantially horizontal and comes into contact with the mechanical stop, so that it is in the second open position.

The third aspect of the disclosure may seek to provide a method to use the front hood as a table. A technical benefit may include pivoting the front hood in a safe and efficient manner so it can be used as a table.

Optionally in some examples, including in at least one preferred example, the front hood further comprises an air-cooling opening and at least one shutter, the method further comprising:

- while the front hood is in the second open position, moving the at least one shutter from an open position where the shutter leaves the air-cooling opening uncovered into a closed position where the shutter covers the air-cooling opening.

A technical benefit may include increasing the surface of the front hood that can be used as a table.

Optionally in some examples, including in at least one preferred example, the front hood comprises a plurality of shutters and the front hood further comprises a linking rod, connected to each shutter, the method further comprising:

- moving the linking rod from a first position, wherein all the shutters are in the open position to a second position, wherein all the shutters are in the closed position.

A technical benefit may include moving the shutters in a faster and more efficient way.

Optionally in some examples, including in at least one preferred example, the method further comprises pivoting the front hood in the closed position. A technical benefit may include using the front hood in a safe manner.

Optionally in some examples, including in at least one preferred example, the method further comprises pivoting the front hood from the first open position to the closed position by:

- pivoting the front hood around the first axis until the front hood covers the opening; and
- engaging the second pivoting system.

A technical benefit may include using the front hood as a table when it is initially in the first position in a safe and efficient way.

The disclosed aspects, examples, and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

BRIEF DESCRIPTION OF THE DRAWINGS

Examples are described in more detail below with reference to the appended drawings.

DETAILED DESCRIPTION

The detailed description set forth below provides information and examples of the disclosed technology with sufficient detail to enable those skilled in the art to practice the disclosure.

Figure 1:
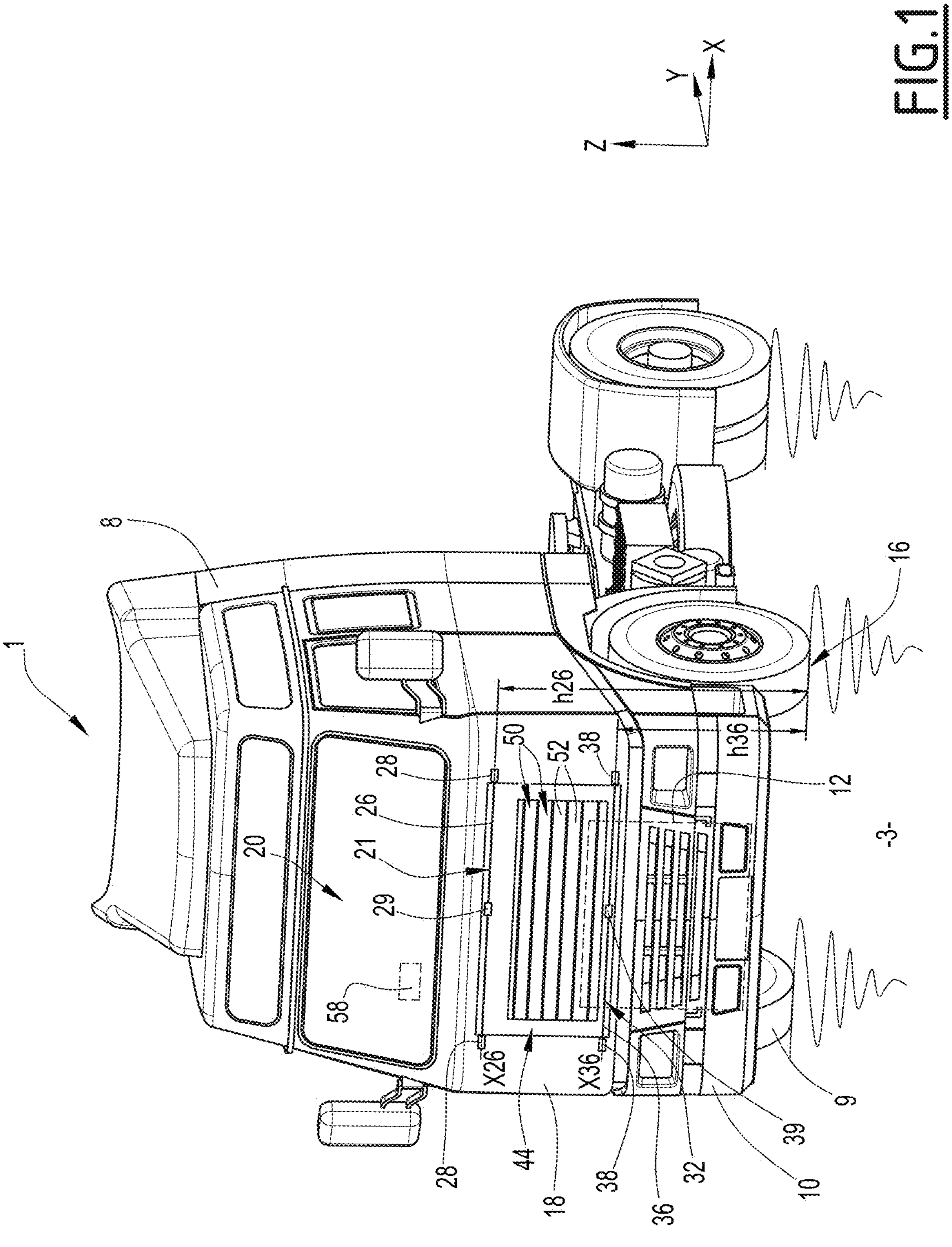
FIG. 1 shows, in perspective view from the front, a vehicle according to an example, wherein a front hood of the vehicle is in a closed configuration.

FIG. 1 shows an exemplary vehicle, here a truck 1, in perspective view from the front. The truck 1 stands on a ground 3 and comprises a vehicle front 6, also called truck front. The vehicle front 6 comprises a cabin 8, front wheels 9, a front bumper 10, a vehicle motor 12, also called truck motor, schematically represented in dotted lines on FIGS. 1 and 2, a cooling radiator 14 and two mechanical stops 15. In a non-represented variant, the number of stops 15 is different from two, e.g. equal to one or larger than or equal to three. The cooling radiator 14 is configured to cool the truck motor 12 when the truck motor 12 is functioning.

The front wheels 9 define a bottom 16 of the vehicle front 6, which is a lowest point of the front wheels 9, where the front wheels 9 are in contact with the ground 3.

The truck motor 12 is, in the example of the figures, an internal combustion engine.

The truck motor 12, and advantageously, the cooling radiator 14 and the mechanical stops are located in a motor compartment 17 accessible from the vehicle front 6 via a motor compartment opening O17, also called opening, located on the vehicle front 6.

In some examples not represented, the motor is an electric motor, and the vehicle front does not comprise a cooling radiator.

A transversal axis X, a longitudinal axis Y and a height axis Z, perpendicular to each other are defined in relation to the truck 1.

The vehicle front 6 further comprises a frame 18 and a front hood 20. In the example of the figures, the frame 18 frames the opening O17 and the front hood 20 on each side, along the transversal axis X. The frame 18 is for example a part of the cabin 8, or secured to the cabin 8. An area of the front hood 20 is advantageously superior or equal to 0.5 $m^2$. The front hood 20 comprises a first pivoting system 21. The first pivoting system 21 comprises a retractable rod 26 which extends along a first axis X26, parallel to the transversal axis X. The first axis X26 is positioned at a first axis height h26, measured from the bottom 16 of the vehicle front 6 along the height direction Z. The first axis height h26 is for example comprised between 1.50 m and 2 m, but in other examples the first axis height h26 is higher than 2 m or lower than 1.50 m.

The first pivoting system 21 is configured to be engaged and disengaged, by a user of the truck 1, who is advantageously a driver of the truck 1. When the first pivoting system 21 is engaged, ends of the rod 26 are inserted in housings 28 included in the frame 18, located on each side of the front hood 20 along the transversal axis X, and the front hood 20 is configured to pivot around the first axis X26. When the first pivoting system 21 is disengaged, the ends of the rod 26 are free from the housings 28 and the front hood 20 is configured to move independently of the first axis X26.

The first pivoting system 21 is disengaged by pressing on a first button 29. Pressing the first button 29 frees the ends of the rod 26 from the housings 28, for example by a mechanical actuation, such a spring system, or by an electrical or hydraulic actuation.

The front hood 20 further comprises a second pivoting system 32, which is similar to the first pivoting system 21. The second pivoting system 32 comprises a retractable rod 36 extending along a second axis X36, parallel to the first axis X26. The second axis X36 is located at a second axis height h36, measured from the bottom 16 of the vehicle front 6 along the height direction Z. The second axis height h36 is for example comprised between 80 cm and 1.30 m from the bottom 16 of the vehicle front 6, but in other examples the second axis height h36 is higher than 1.30 m or lower than 80 cm.

The second pivoting system 32 is configured to be engaged and disengaged by the user. When the second pivoting system 32 is engaged, ends of the rod 36 are inserted in housings 38 included in the frame 18, and located on each side of the front hood 20 along the transversal axis X. In this case, the front hood 20 is configured to pivot around the second axis X36. When the second pivoting system 32 is disengaged, the ends of the rod 26 are free from the housings 38 and the front hood 20 is configured to move independently of the first axis X26.

The second pivoting system 32 is disengaged by pressing on a second button 39. Pressing the second button 39 frees the ends of the rod 36 from the housings 38 for example by a mechanical actuation, such a spring system, of by an electrical or hydraulic actuation.

In some examples, not represented, the first and second pivoting systems are implemented by other systems such as a hinge system.

In some examples, not represented, the first and second pivoting systems 21 and 32 are engaged and disengaged through other means such as by operating a handle. The first and second buttons, or more generally the means for engaging and disengaging the pivoting systems 21 and 32, may not be located on the front hood 6, and may for example be located on a dashboard inside the cabin 8 of the truck 1.

At least one of the first and second pivoting systems 21 and 32 is engaged at all times. In other words, when the first pivoting system 21 is disengaged, the second pivoting system 32 is engaged, and when the second pivoting system 32 is disengaged, the first pivoting system 21 is engaged. This prevents accidentally disengaging both pivoting systems 21 and 32, causing the front hood 20 to fall. Both pivoting systems 21 and 32 may be engaged at the same time.

The front hood 20 is pivotable between a closed position, a first open position and a second open position.

In the closed position, both pivoting systems 21 and 32 are engaged. The front hood 20 is secured to the frame 18 so that it cannot move relative to the frame 18, is parallel to a plane defined by the height axis Z and the transversal axis X and covers the opening O17, to prevent access to the motor compartment 17, in particular the motor 12, the cooling radiator 14 and the mechanical stops 15. A work surface 42 of the front hood 20 is turned in direction of the truck cabin 8. In particular, in the closed position, the work surface 42 faces the opening O17 along the longitudinal axis Y, and advantageously also faces the motor compartment 17, in particular the motor 12 and the cooling radiator 14 along the longitudinal axis Y. An exterior surface 44 of the front hood 20, opposite the work surface 42 along the longitudinal axis Y, faces away from the cabin 8, and is accessible from outside the truck 1.

Figure 2:
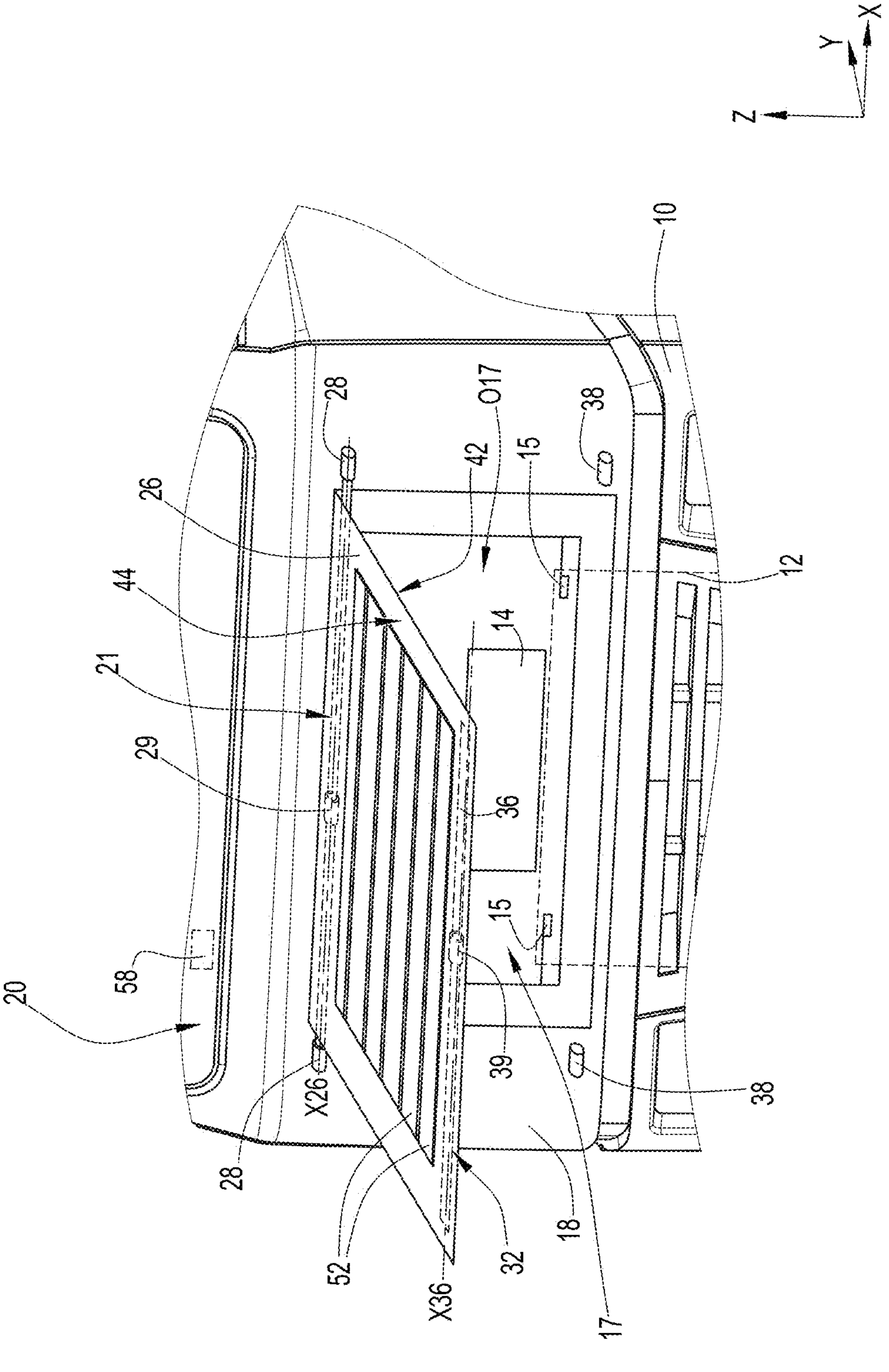
FIG. 2 is a detail of a front of the vehicle of FIG. 1, wherein the front hood is in a first open position.

In the first open position, also called the up position, the first pivoting system 21 is engaged and the second pivoting system 32 is disengaged. The front hood 20 is pivoted around the first axis X26, away from the rest of the truck front 6, and leaves the opening O17 uncovered, therefore allowing access to the motor compartment 17, in particular the motor 12, the cooling radiator 14 and the mechanical stops 15. The work surface 42 faces the ground 3, in other words, faces downwards, and the exterior surface 44 faces away from the ground 3, in other words, faces upwards. The first open position is represented in FIG. 2. In the first open position, the user can easily access the motor compartment 17, in particular the motor 12, the cooling radiator 14, the mechanical stops 15 and other equipment, not represented, through the opening O17 that is covered by the front hood 20 when in the closed position, for example to perform repairs. A rod, or a hydraulic cylinder, not represented, maintains the front hood 20 in the first open position.

Figure 3:
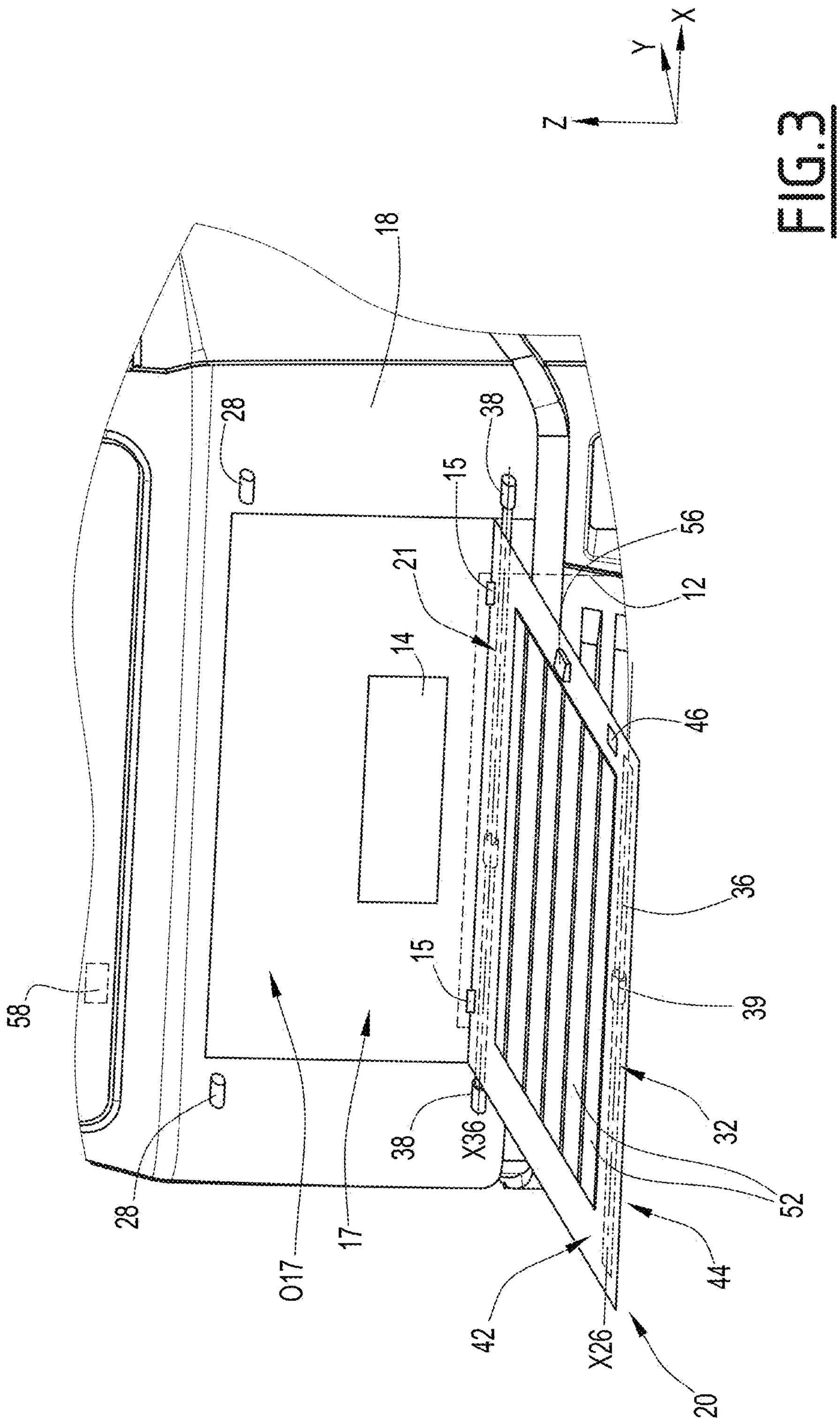
FIG. 3 is a detail of a front of the vehicle of FIG. 1, wherein the front hood is in a second open position.

In the second open position, also called the down position and visible on FIG. 3, the second pivoting system 32 is engaged and the first pivoting system 21 is disengaged. The front hood 20 is pivoted around the second axis X36 and parallel to a plane defined by the transversal axis X and the longitudinal axis Y, in other words substantially horizontal. Advantageously, the ground 3 is essentially flat and horizontal, therefore when the front hood 20 is parallel to the ground 3, it is substantially horizontal. In the second open position, the front hood 20 is in contact with the mechanical stops 15, which stops the rotation of the front hood 20 around the second axis X36, so that the front hood 20 stays substantially horizontal. In the second open position, the exterior surface 44 faces the ground 3, in other words, faces downwards, and the work surface 42 faces away from the ground 3, or in other words, faces upwards. In the second open position, the front hood 20 is at an appropriate height for use as a table, as it is at the second axis height h36. In addition to this, an area of the front hood 20 is advantageously superior or equal to 0.5 $m^2$, therefore providing an area of sufficient size to be used as a table.

In some examples, the pivoting systems 21 and 32 are further configured to be locked when both are in the engaged position, which maintains the front hood 20 in the closed position, and limits a risk of the front hood 20 opening, for example while the truck 1 is being driven by the user.

The front hood 20 further comprises a hood sensor 46, which is configured to determine if the front hood 20 is in the closed position or in the second open position. Advantageously, the hood sensor 46 is further configured to determine if the front hood 20 is in the first open position. The hood sensor 46 is for example an accelerometer, which measures an acceleration of the hood and its direction, to detect if the front hood 20 is pivoted in the first position, in the second position or in the closed position. As a variant, the hood sensor is a gyroscope or another type of sensor.

The front hood 20 further comprises at least one air-cooling opening, here a plurality of air-cooling openings 50, and at least one shutter, here a plurality of shutters 52. The air-cooling openings 50 are configured to let air circulate through them. Each shutter 52 is associated to an air-cooling opening 50. Each shutter 52 is movable between an open position and a closed position. In the open position, the shutter 52 leaves its associated air-cooling opening 50 uncovered, so that air may flow through the air-cooling opening 50, and in the closed position, the shutter 52 covers its associated air-cooling opening 50, so that a flow of air through the air-cooling opening 50 is restricted. Advantageously, when the shutters 52 are in the closed position, the work surface 44 is flat. This enables the entirety of the work surface 44 to be used as a table, therefore making the works surface 44 more convenient and spacious for the user.

Figure 4:
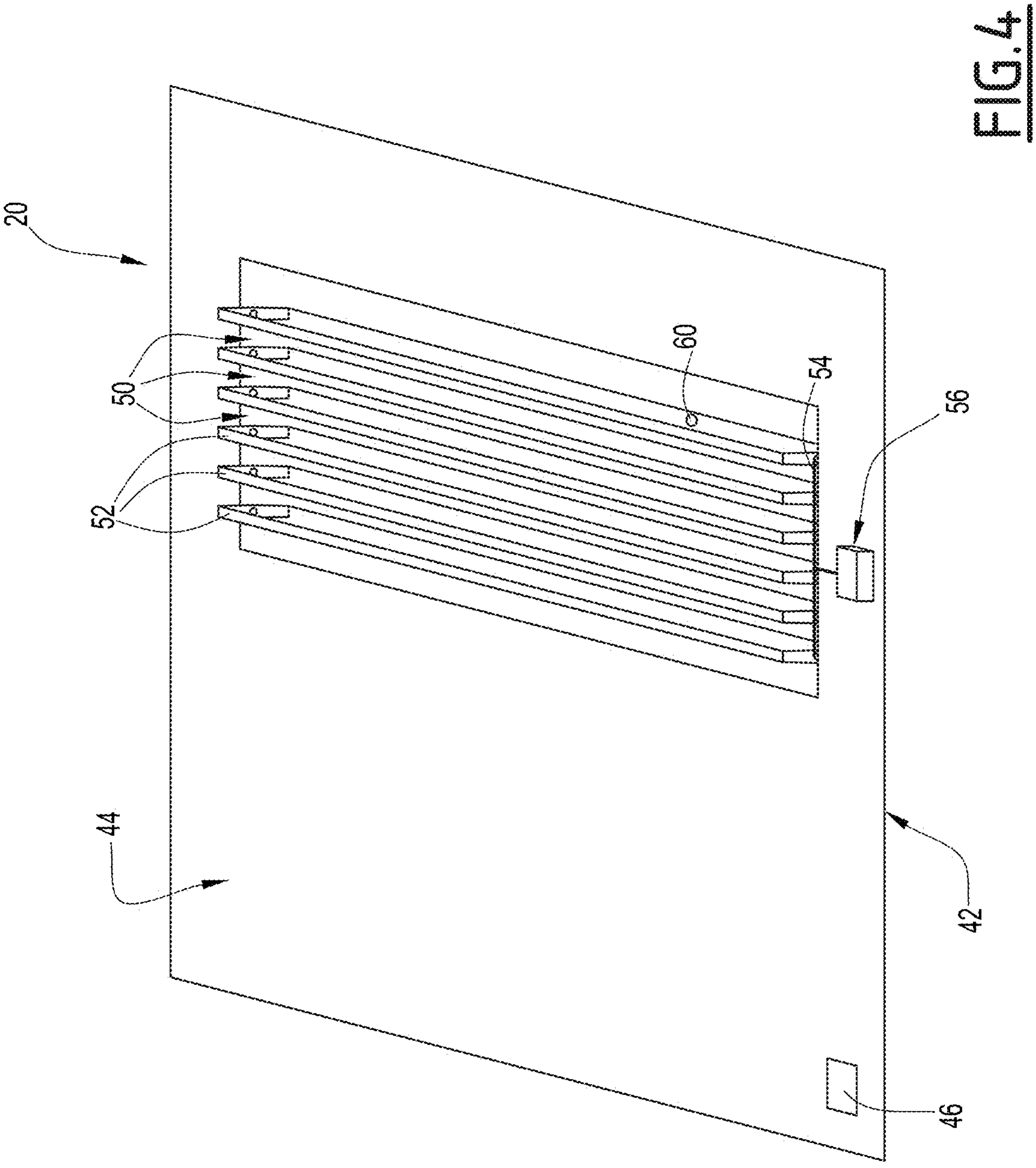
FIG. 4 is a perspective view of the front hood of FIG. 1 with shutters in an open position.
Figure 5:
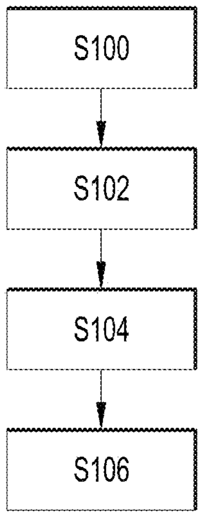
FIG. 5 is a block diagram of a method for using a front hood of a vehicle front as a table, according to an example.

In the examples of FIGS. 1 to 4, the front hood 20 comprises a linking rod 54, visible on FIG. 4, and a rod motor 56. The linking rod 54 is connected to each shutter 52 and is movable between a first position and a second position. In the first position of the linking rod, each shutter 52 is in the open position and in the second position of the linking rod, each shutter 52 is in the closed position.

In some examples not represented, the front hood 20 comprises only one shutter 52, this one shutter 52 being connected to the linking rod 54.

The rod motor 56 is for example an electric motor and is connected to the linking rod 54. The rod motor 56 is configured to move the linking rod 54 between its first and second positions and vice-versa.

In some examples, the front hood does not comprise a rod motor, and the user moves manually the linking rod in its first position and in its second position.

In some examples, the rod motor is controlled by the user, for example by pressing a button.

In the example represented in the FIGS. 1 to 4, the rod motor 56 is controlled by a control unit 58, schematically represented on FIG. 1, which receives measurements from the hood sensor 46. When the hood sensor 46 determines that the front hood 20 is in the second open position, the control unit 58 commands the rod motor 56 to move the linking rod 54 in the second position, therefore moving all the shutters 52 in the closed position. When the hood sensor 46 determines that the front hood 20 is in the closed position, the control unit 58 commands by default the rod motor 56 to move the linking rod 54 in the first position, therefore moving all the shutters 52 in the open position. Advantageously, the user can command the rod motor 56 to move the linking rod 54 back in the second position and to stay in the second position, which allows driving the truck 1 in cold or freezing weather. Advantageously, if the motor 12 generates enough heat, the user can command the rod motor 56 to move from the second position to the first position. In variant a temperature sensor monitors a temperature of the motor 12 and commands the rod motor 56, for example via the control unit 58, to move the linking rod 54 in the second position if the temperature is below a temperature threshold and in the first position if the temperature is above the temperature threshold.

Advantageously, the control unit 58 commands by default the rod motor 56 to move the linking rod 54 in the first position when the hood sensor 46 determines that the front hood 20 is in the closed position and the truck motor 12 is on.

Optionally, the front hood 20 further comprises a shutter sensor 60, configured to determine if the shutters 52 are in the open or in the closed position. Shutter sensor 60 is for example a gyroscope, or a position sensor and is visible on FIG. 4. In the example of FIG. 4, the shutter sensor 60 is located on a shutter 52 but it may be located elsewhere on the front hood 20.

Advantageously, the shutter sensor 60 is connected to the control unit 58. The control unit 58 is further configured to send an alarm signal, for example a visual alarm displayed in the cabin 8, if the truck motor 12 is on, the hood sensor 46 determines that the front hood 20 is in the closed position and the shutter sensor 60 determines that the shutters 52 are in the closed position. In other words, the control unit 58 is configured to send an alarm in case of a malfunction of the rod motor 56 or of the shutters 52 that prevents the shutters 52 from opening when the front hood 20 is in the closed position and the truck motor 12 is on. This advantageously prevents the truck motor 12 from overheating due to lack of air-cooling.

In some examples, the control unit 58 is further configured to send an alarm signal if the truck motor 12 is on and the front hood 20 is in the first or the second open position, to warn the driver that the front hood 20 is not in a position that is safe for driving.

A method for using the front hood 20 as a table is now described.

Optionally, the front hood 20 is in the first open position, and a first step S100 consists in pivoting the front hood 20 from the first open position to the closed position, by pivoting the front hood 20 until it covers the opening O17, therefore preventing access to the motor compartment 17, in particular the motor 12, the cooling radiator 14 and the mechanical stops 15, and engaging the second pivoting system 32. Step S100 is advantageously performed by the user who manually pivots the front hood 20 and engages the second pivoting system 32. At the end of step S100, both pivoting systems 21 and 32 are engaged.

A second step S102 consists in disengaging the first pivoting system 21, while the second pivoting system 32 is engaged. Step S102 is advantageously performed by the user, by pressing on the first button 29.

A third step 104 consists in pivoting the front hood 20 in the second open position, by pivoting the front hood around the second axis X36, until it is substantially horizontal and comes into contact with the mechanical stops 15.

A fourth step 106 consists in moving the shutters 52 into the closed position. The hood sensor 46 determines that the front hood 20 is in the second open position, and the control unit 58 commands the rod motor 56 to move the linking rod 54 from the first position to the second position, to move all the shutters 52 in the closed position. The work surface 44 becomes flat, and the front hood 20 may be used as a table by the user. The user may position different objects on the front hood 20, including on the shutters 52, such as tableware, a laptop, books, etc.

In some examples, during step 106, the user moves manually the linking rod 54 in the second position.

A method to use the front hood 20 as a front hood of the truck 1 is now described.

The front hood 20 is in the second open position and the shutters 52 are in the closed position. The user then pivots the front hood 20 in the closed position, by pivoting the front hood 20 around the second axis X36 until the front hood 20 covers the opening O17, therefore preventing access to the motor compartment 17, in particular the motor 12, the cooling radiator 14 and the mechanical stops 15, and engages the first pivoting system 21.

The user starts the truck motor 12.

The control unit 58 receives information from the hood sensor 46 that the front hood 20 is in the closed position and that the truck motor 12 is on and commands the rod motor 56 to move the linking rod 54 from the second position to the first position, therefore moving all the shutters 52 from the closed position to the open position.

In some examples, moving the linking rod in the first position is done manually by the user before pivoting the front hood in the closed position.

Figure 6:
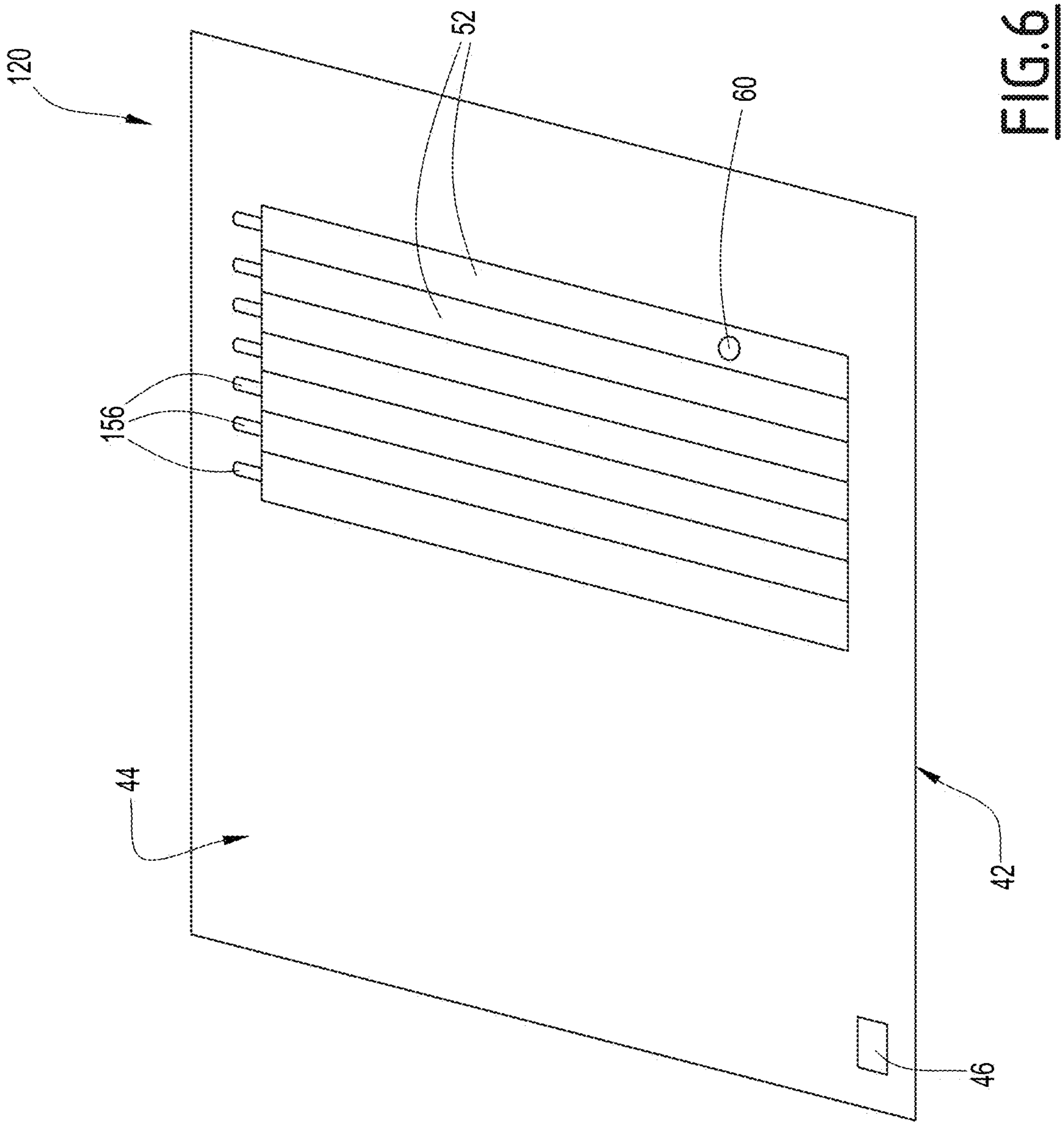
FIG. 6 is a perspective view of the front hood according to another example, comprising shutters in a closed position.

FIG. 6 shows another example of a front hood 120. Front hood 120 differs from front hood 20 in that it does not comprise a linking rod nor a rod motor, and comprises at least one, here multiple shutter motors 156. Each shutter 52 is associated with one shutter motor 156, which moves the shutter 52 in the open and in the closed position.

When the hood sensor 46 determines that the front hood 120 is in the open position, the control unit 58 commands each shutter motor 156 to move its associated shutter 52 in the closed position. When the hood sensor 46 determines that the front hood 120 is in the closed position, the control unit 58 commands each shutter motor 156 to move its associated shutter 52 in the open position.

In a not represented variant, the front hood 120 comprises only one shutter 120, associated to one shutter motor 156 which moves the shutter in the open and in the closed position.

In some examples, the front hood does not comprise shutter motors and the user moves manually each shutter in the open and in the closed position.

Example 1: A vehicle front 6 for a vehicle 1, the vehicle front 6 comprising:

- a motor compartment 17;
- an opening O17, configured to give access to the motor compartment 17;
- at least one mechanical stop 15; and
- a front hood 20; 120, the front hood 20; 120 comprising:
  - a first pivoting system 21, configured to be engaged, wherein the front hood 20;120 is configured to pivot around a first axis X26, and disengaged, wherein the front hood 20;120 is configured to move independently of the first axis X26; and
  - a second pivoting system 32, configured to be engaged, wherein the front hood 20 is configured to pivot around a second axis X36, parallel to the first axis X26, and disengaged, wherein the front hood 20;120 is configured to move independently of the second axis X36,
- wherein the front hood 20;120 is pivotable between a closed position, a first open position and a second open position, wherein:
- in the closed position, the front hood 20;120 covers the opening O17 and the first and second pivoting systems 21, 32 are engaged;
- in the first open position, the first pivoting system 21 is engaged, the second pivoting system 32 is disengaged and the front hood 20; 120 is pivoted around the first axis X26 and leaves the opening O17 uncovered; and
- in the second open position, the second pivoting system 32 is engaged, the first pivoting system 21 is disengaged and the front hood 20; 120 is pivoted around the second axis X36 to be substantially horizontal;

wherein when the front hood 20;120 is in the second open position, the front hood 20; 120 comes into contact with the mechanical stop 15, which maintains the front hood 20; 120 substantially horizontal so the front hood 20; 120 can be used as a table.

Example 2: The vehicle front 6 of example 1, wherein when the first pivoting system 21 is disengaged, the second pivoting 32 system is engaged, and when the second pivoting system 32 is disengaged, the first pivoting system 21 is engaged.

Example 3: The vehicle front 6 of any of examples 1 and 2, wherein the first axis X26 extends at a first axis height h26, measured from a bottom 16 of the vehicle front 6, and the second axis X36 extends at a second axis height h36, measured from the bottom 16 of the vehicle front 6, and wherein the first axis height h26 is superior to the second axis height h36.

Example 4: The vehicle front 6 of any of examples 1 to 3, wherein the front hood 20; 120 comprises an air-cooling opening 50 and a shutter 52 movable between an open position, wherein the shutter 52 leaves the air-cooling opening 50 uncovered, and a closed position, wherein the shutter 52 covers the air-cooling opening 50.

Example 5: The vehicle front 6 of example 4, wherein when the front hood 20; 120 is in the second open position, the shutter 52 is in the closed position.

Example 6: The vehicle front 6 of any of examples 4 to 5, wherein, when the shutter 52 is in the closed position, a work surface 44 of the front hood 20 is flat.

Example 7: The vehicle front 6 of any of examples 4 to 6, wherein the front hood 120 further comprises a shutter motor 156, configured to move the shutter 52 in the closed position and in the open position.

Example 8: The vehicle front 6 of any of examples 4 to 7, further comprising a vehicle motor 12, located in the motor compartment 17 for propelling the vehicle 1, wherein when the front hood 20; 120 is in the closed position and the vehicle motor 12 is on, the shutter 52 is in the open position.

Example 9: The vehicle front 6 of example 8, further comprising a hood sensor 46, configured to determine a position of the front hood 120 between the closed position and the second open position and wherein, when the hood sensor 46 determines the front hood 120 to be in the closed position, the shutter motor 156 moves the shutter 52 into the open position and when the hood sensor 46 determines the front hood 120 to be in the second closed position, and the vehicle motor 12 is on, the shutter motor 156 moves the shutter 52 into the open position.

Example 10: The vehicle front 6 of examples 1 to 3, the front hood 20 comprises a plurality of shutters 52 and front hood 20 further comprises a linking rod 54, connected to each shutter 52, and the linking rod 54 is configured to move between a first position, where all the shutters 52 are in the open position, and a second position, where all the shutters 52 are in the closed position.

Example 11: The vehicle front 6 of example 10, the linking rod 54 is connected to a rod motor 56, configured to move the linking rod 54 in the first and the second position.

Example 12: A vehicle 1 comprising the vehicle front 6 according to any of examples 1 to 11.

Example 13: The vehicle 1 according to example 12, further comprising a cooling radiator 14 located in the motor compartment 17, the opening O17 being further configured to give access to the cooling radiator 14.

Example 14: The vehicle 1 according to any of the examples 12 to 13, wherein the vehicle front 6 is according to example 4 and wherein the vehicle front 6 further comprises a shutter sensor 60, configured to determine if the shutter 52 is in the open position or in the closed position.

Example 15: The vehicle 1 according to example 14, wherein the vehicle front 6 is according to example 9 and wherein the vehicle 1 comprises a control unit 58, configured to send an alarm signal if the vehicle motor 12 is on, the hood sensor 46 measures that the front hood 120 is in the closed position and the shutter sensor 60 determines that the shutter 52 is in the closed position.

Example 16: A method for using a front hood 20; 120 of a vehicle front 6 for a vehicle 1 as a table, the vehicle front 6 comprising:

- a motor compartment 17;
- an opening O17, configured to give access to the motor compartment 17;
- at least one mechanical stop 15; and
- a front hood 20; 120, the front hood 20; 120 comprising:
  - a first pivoting system 21, configured to be engaged, wherein the front hood 20; 120 is configured to pivot around a first axis X26, and disengaged, wherein the front hood 20; 120 is configured to move independently of the first axis X26; and
  - a second pivoting system 32, configured to be engaged, wherein the front hood 20; 120 is configured to pivot around a second axis X36, parallel to the first axis X26, and disengaged, wherein the front hood 20; 120 is configured to move independently of the second axis X36,
- wherein the front hood 20; 120 is pivotable between a closed position, a first open position and a second open position, wherein:
- in the closed position the front hood 20; 120 covers the opening O17 and the first and second pivoting systems 21, 32 are engaged,
- in the first open position, the first pivoting system 21 is engaged, the second pivoting system 32 is disengaged and the front hood 20; 120 is pivoted around the first axis X26 and leaves the opening O17 uncovered,
- in the second open position, the second pivoting system 32 is engaged, the first pivoting system 21 is disengaged and the front hood 20; 120 is pivoted around the second axis X36 to be substantially horizontal;

wherein when the front hood 20; 120 is in the second open position, the front hood 20; 120 comes into contact with the mechanical stop 15, which maintains the front hood 20; 120 substantially horizontal so it can be used as a table, the method comprising:

- while the second pivoting system 32 is engaged, disengaging S102 the first pivoting system 21; and
- pivoting S104 the front hood 20; 120 around the second axis X36 until it is substantially horizontal and comes into contact with the mechanical stop 15, so that it is in the second open position.

Example 17: The method of example 16, wherein the front hood 20; 120 further comprises an air-cooling opening 50 and a shutter 52, the method further comprising:

- while the front hood 20; 120 is in the second open position, moving at step S106 the shutter 52 from an open position wherein the shutter leaves the air-cooling opening 50 uncovered into a closed position wherein the shutter 50 covers the air-cooling opening 52.

Example 18: The method of any of examples 15 and 16, wherein the front hood 20; 120 comprises a plurality of shutters 52 and the front hood 20 further comprises a linking rod 54, connected to each shutter 52, the method further comprising:

moving S106 the linking rod 54 from a first position, wherein all the shutters 52 are in the open position to a second position, wherein all the shutters 52 are in the closed position.

Example 19: The method of any of the examples 16 to 18, wherein the method further comprises pivoting S100 the front hood 20; 120 in the closed position.

Example 20: The method of any of the examples 16 to 18, wherein the method further comprises pivoting S100 the front hood from the first open position to the closed position by:

pivoting the front hood 20; 120 around the first axis X26 until the front hood 20; 120 covers the opening O17; and engaging the second pivoting system 32.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A vehicle front for a vehicle, the vehicle front comprising:

a motor compartment;

an opening, configured to give access to the motor compartment;

at least one mechanical stop; and a front hood, the front hood comprising:

a first pivoting system, configured to be engaged, wherein the front hood is configured to pivot around a first axis, and disengaged, wherein the front hood is configured to move independently of the first axis; and a second pivoting system, configured to be engaged, wherein the front hood is configured to pivot around a second axis, parallel to the first axis, and disengaged, wherein the front hood is configured to move independently of the second axis, wherein the front hood is pivotable between a closed position, a first open position and a second open position, wherein:

in the closed position, the front hood covers the opening and the first and second pivoting systems are engaged;

in the first open position, the first pivoting system is engaged, the second pivoting system is disengaged and the front hood is pivoted around the first axis and leaves the opening uncovered; and in the second open position, the second pivoting system is engaged, the first pivoting system is disengaged and the front hood is pivoted around the second axis to be substantially horizontal;

wherein when the front hood is in the second open position, the front hood comes into contact with the mechanical stop, which maintains the front hood substantially horizontal so the front hood can be used as a table.

2. The vehicle front of claim 1, wherein when the first pivoting system is disengaged, the second pivoting system is engaged, and when the second pivoting system is disengaged, the first pivoting system is engaged.

3. The vehicle front of claim 1, wherein the first axis extends at a first axis height, measured from a bottom of the vehicle front, and the second axis extends at a second axis height, measured from the bottom of the vehicle front, and wherein the first axis height is superior to the second axis height.

4. The vehicle front of claim 1, wherein the front hood comprises an air-cooling opening and at least one shutter movable between an open position, where the shutter leaves the air-cooling opening uncovered, and a closed position, where the shutter covers the air-cooling opening.

5. The vehicle front of claim 4, wherein when the front hood is in the second open position, the shutter is in the closed position.

6. The vehicle front of claim 4, wherein, when the shutter is in the closed position, a work surface of the front hood is flat.

7. The vehicle front of claim 4, wherein the front hood further comprises a shutter motor, configured to move the shutter in the closed position and in the open position.

8. The vehicle front of claim 4, further comprising a vehicle motor, located in the motor compartment for propelling the vehicle, wherein when the front hood is in the closed position and the vehicle motor is on, the shutter is in the open position.

9. The vehicle front of claim 8, further comprising a hood sensor, configured to determine a position of the front hood between the closed position and the second open position and wherein, when the hood sensor determines the front hood to be in the closed position, the shutter motor moves the shutter into the open position and when the hood sensor determines the front hood to be in the second closed position, and the vehicle motor is on, the shutter motor moves the shutter into the open position.

10. The vehicle front of claim 9, wherein the at least one shutter comprises a plurality of shutters and the front hood further comprises a linking rod, connected to each shutter of the plurality of shutters, and the linking rod is configured to move between a first position, where all the shutters of the plurality of shutters are in the open position, and a second position, where all the shutters of the plurality of shutters are in the closed position.

11. The vehicle front of claim 10, wherein the linking rod is connected to a rod motor, configured to move the linking rod in the first and the second position.

12. A vehicle comprising the vehicle front of claim 1.

13. The vehicle according to claim 12, wherein the front hood comprises an air-cooling opening and at least one shutter movable between an open position, where the shutter leaves the air-cooling opening uncovered, and a closed position, where the shutter covers the air-cooling opening; and wherein the vehicle front further comprises a shutter sensor, configured to determine if the at least one shutter is in the open position or in the closed position.

14. A method for using a front hood of a vehicle front for a vehicle as a table, the vehicle front comprising:

a motor compartment;

an opening, configured to give access to the motor compartment;

at least one mechanical stop; and a front hood, the front hood comprising:

a first pivoting system, configured to be engaged, wherein the front hood is configured to pivot around a first axis, and disengaged, wherein the front hood is configured to move independently of the first axis; and a second pivoting system, configured to be engaged, wherein the front hood is configured to pivot around a second axis, parallel to the first axis, and disengaged, wherein the front hood is configured to move independently of the second axis, wherein the front hood is pivotable between a closed position, a first open position and a second open position, wherein:

in the closed position the front hood covers the opening and the first and second pivoting systems are engaged;

in the first open position, the first pivoting system is engaged, the second pivoting system is disengaged and the front hood is pivoted around the first axis and leaves the opening uncovered; and in the second open position, the second pivoting system is engaged, the first pivoting system is disengaged and the front hood is pivoted around the second axis to be substantially horizontal;

wherein when the front hood is in the second open position, the front hood comes into contact with the mechanical stop, which maintains the front hood substantially horizontal so it can be used as a table, the method comprising:

while the second pivoting system is engaged, disengaging the first pivoting system; and pivoting the front hood around the second axis until it is substantially horizontal and comes into contact with the mechanical stop, so that it is in the second open position.

15. The method of claim 14, wherein the front hood further comprises an air-cooling opening and at least one shutter, the method further comprising:

while the front hood is in the second open position, moving the at least one shutter from an open position where the shutter leaves the air-cooling opening uncovered into a closed position where the shutter covers the air-cooling opening.

* * * * *